Sept. 21, 1971  J. ANDREWS ET AL  3,606,846

STOWABLE TABLE AND BASE

Filed Dec. 11, 1969

INVENTORS:
John Andrews
Lewis Edgar Clack

BY: *James R. Hoalson, Jr.*
*Philip J. Liggett*

ATTORNEYS

United States Patent Office 3,606,846
Patented Sept. 21, 1971

3,606,846
STOWABLE TABLE AND BASE
John Andrews, New Preston, and Lewis Edgar Clack, Torrington, Conn., assignors to Univeral Oil Products Company, Des Plaines, Ill.
Filed Dec. 11, 1969, Ser. No. 884,165
Int. Cl. A47b 3/08
U.S. Cl. 108—132          5 Claims

ABSTRACT OF THE DISCLOSURE

A stowable table having a platform with a leg support member that rotates into a recessed region of the platform for storage purposes. When in use, the leg support member is maintained in an extended position by a brace which is rotatably connected to the support member and which is maintained in a guide located within the recessed region by a spring. A cam-type release mechanism may be activated to remove the brace from the bias of the spring and allow the brace to be moved within the guide, which in turn causes the leg support member to be rotated into the recessed region. A removable form of pedestal base is provided to support the stowable table and is adapted for mounting between a pair of seats. The base includes a support post having an upper end portion with receptacle means for receiving the leg support member of the table and, in addition, has projecting members from the support post that are sized to engage and clamp onto the under framing of the adjacent seats.

---

The present invention is directed in part to a removable form of table which has a leg support member that is insertable in a support base and, in addition, being capable of rotating and folding completely within the outer dimensional limits of the tabletop section, thus making the table completely stowable. The invention is also directed to a special pedestal type support base for use in conjunction with the table section that is adapted for being removably mounted between a pair of seats.

The table and base combination are especially adaptable for use in the transportation industry, and particularly the airline branch of that industry, where meals of some sort or another are served during flight time. Typically, in an airplane, the seat in front of the passenger is used for the support and storage of a small platform for use by a passenger in serving himself a meal. However, when no such front seat exists, an alternative must be provided. The present invention presents this alternative by providing a stowable table section and a pedestal base adapted for mounting between two seats.

It is therefore an object of this invention to provide for a stowable table having a collapsible leg support member that may be completely folded within the outer dimensional limits of the tabletop or platform portion to enable a plurality of such tables to be stacked adjacent other similar tables in a compact and stable manner.

Another object of this invention is to provide for a stowable table that has a collapsible leg support which has simple operating characteristics.

Still another object of this invention is to provide a pedestal base suitable for supporting one or a pair of the stowable table sections and which is adaptable for mounting between a pair of seats.

Another object of this invention is to provide a pedestal base which is adapted for mounting between a pair of vehicle seats and which also serves as a convenience center for the passengers of the adjacent seats.

In a broad aspect, this invention provides for a stowable table section having a collapsible leg support member which is insertable in a base section which comprises: a table platform having a substantially flat top surface and a lower surface with a recessed region therein, a leg support member having an end sized for insertion into said base section and having an opposing end rotatably connected to said platform within said recessed region, and said leg support member sized and positioned to be capable of folding completely into said recessed region, brace guide means connected to said platform within said recessed region, said brace guide means including an elongated slotway substantially parallel with the surface of said platform and perpendicular to the axis of rotation of said leg support member and a secondary slotway transversely communicating with said elongated slotway, a brace member having a first end rotatably connected to said leg support member and having a second end slideably engaged and connected to said slotways, spring means connected to said platform within said recessed region, said spring means positioned in proximity to said secondary slotway and biased to maintain the second end of said brace member in said secondary slotway when said second end is caused to be located therein to thereby maintain said leg support and brace members in a rigid relationship to said platform, and, releasing means connected to said table within said recessed region for counteracting the bias of said spring means and for permitting movement of the second end of said brace member into said elongated slotway, whereby, when activated, said releasing means will move said brace member from the bias of said spring means into a slideable relationship with said elongated slotway to thereby permit said leg support member to be rotated completely into said recessed region.

Of course, such a table section may be used in various types of base sections and support means. For instance, a slot may be provided in a support member which is attached to, or becomes part of a wall. However, the present invention also provides for a specialized base for supporting this particular insertable table, although the base section may be used in conjunction with other form of insertable tables.

Thus, in another aspect, this invention provides for a removable form of pedestal base for supporting at least one insertable table section and is adapted for mounting between a pair of adjacent seats and for connecting to the under framing thereof, with such base comprising; a support post having an upper end portion with insertion means for reception of said insertable table, a lower projecting member from said support post sized to engage a lower portion of seat under framing, an upper projecting member from said support post, sized to engage an upper portion of seat under framing, and locking means associated with at least one of said projecting members for latching said projecting members in a fixed relationship with the under framing of said seats.

In the preferred arrangement of this pedestal base, an ash tray or convenience tray is provided in the uppermost portion of the support post. Slots are positioned on either side of the ash tray to provide the receptacle means for two insertable tables.

Reference to the accompanying drawing and the following description thereof, will serve to point out and more fully illustrate the design and the construction of our invention as well as to assist in further setting forth certain advantageous features in connection therewith.

Figure 1:
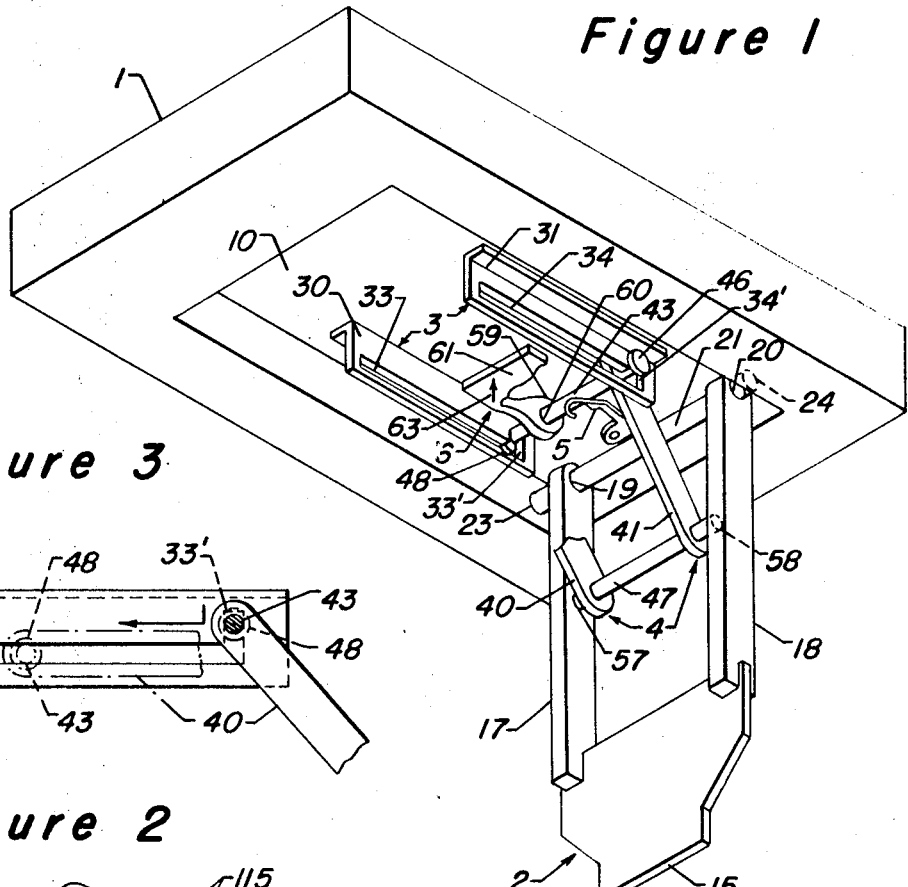
FIG. 1 is a schematical pictorial view of an embodiment of the stowable table section.

Referring now more particularly to FIG. 1 of the drawing, the stowable table section is shown to comprise a table platform 1, a leg support member 2, guide means 3, brace member 4, spring means 5, and releasing means 6. The platform 1 is shown to be formed from a solid block of material. For lightweight applications, this block of material may, for example, be made from a polyurethane compound or a lightweight wood. Of course, other materials may well be used in fabricating the table platform portion as well as the other components of the table and base, and the particular ones described are only given by way of example. The table platform may also be made from several pieces of material in a hollow form. The hollow form would present a means by which the various components could be attached to the platform in a concealed manner. Although not shown in FIG. 1, the top of the platform may be recessed a slight amount or have a low rim to prevent objects from sliding off when subjected to acceleration forces. The lower portion of platform 1 has a recessed region 10 for containment of all the parts of the table when the table is to be stored away.

The leg support member 2 has an end 15 which is sized for insertion into a supporting base. The overall length of leg support member 2 should be of a size so as to fit completely within recessed region 10 of platform 1. It is to be noted that for a major portion of its length, the leg support member 2 is divided into two sections 17 and 18 so as to be stable and also so as to be capable of folding completely within recessed region 10 of the platform without interfering with the other components therein. Leg portions 17 and 18 are connected to a shaft 21 at 19 and 20. Shaft 21 in turn is connected to the platform at 23 and 24. To be rotatably connected within the recessed region of the platform, the connections at 19 and 20 or at 23 and 24 are free connections. The details of the free connections at 19 and 20 or at 23 and 24 are not be be considered part of this present invention and may be of the standard free connections used in similar applications.

The brace guide means 3 comprises two elongated bar or plate sections 30 and 31 which are connected to the platform 1 within the recessed region 10. It should be noted that one such plate section would be sufficient for purposes of this invention; however, it has been found that the use of two plate sections has a stabilizing effect on the particular arrangement of parts for the table. In sections 30 and 31 are provided parallel, elongated slotways 33 and 34, respectively. In addition, these slotways are parallel to the surface of the platform and perpendicular to the axis of rotation of the leg support member 2, or, in other words, perpendicular to shaft 21. Communicating transversely with elongated slotways 33 and 34 are secondary slotways 33′ and 34′.

Brace sections 40 and 41 of brace member 4 are slideably connected to each set of slotways by means of a shaft 43. Shaft 43 extends transversely through the slotways to be slideably connected therethrough and, as shown, the shaft 43 has enlarged end portions 46 and 48 to prevent it from being dislodged from the guide means. Brace sections 40 and 41 are connected at their second ends to a shaft 47 which, in turn, connects to portions 17 and 18 of leg support member 2 at 57 and 58. Connections 57 and 58 or the connections from brace sections 40 and 41 to shaft 47 are free, rotating fits to thus provide the rotatable connections of the brace members to the leg support member. As was the case of the rotatable connection between leg support member 2 and platform 1, the details as to be rotatable or free connection of the brace member and the leg support member 2 are considered to be conventional. Also, the use of the two brace sections should not be considered limiting upon this invention, for it is contemplated that in a simpler embodiment only one member need be used, especially where the leg support member is not split and only one guide plate is utilized.

A spring bar or other suitable spring means 5 is connected within recessed region 10 to platform 1 and, in particular, is positioned in proximity to the secondary slotways 33′ and 34′. The spring bar 5 is positioned and is biased so that when shaft 43 is within the secondary slotways 33′ and 34′, it will maintain the shaft 43 therein. Thus, a geometrically stable triangular support for leg support member 2 is established.

Figure 3:
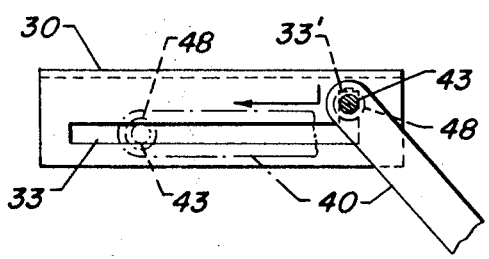
FIG. 3 is a schematical elevational view of a part of the guide means incorporated in the stowable table section showing the action of the slide fit of the brace member.

A suitable releasing means, such as a cam-like releasing device, is used to break the geometrical stable relationship of the brace members and leg support member 2. The device is designated by numeral 6 and in FIG. 1 is shown as being partially broken away. Also, as shown, the device comprises a cam portion 59 which is rotatably connected to shaft 43 at 60 and an activation portion 61 which provides the surface by which the operator may activate the device in a simple manner. Since releasing means 6 is shown as partially broken away, it should be noted that a similar cam portion 59 would normally be located at the other side of spring means 5. To activate this device, the operator merely pushes the portion 61 in the direction of the arrow 63. This action causes shaft 43 to move downward through the secondary slotways and against the bias of spring bar 5. Once removed from the bias of spring bar 5, the brace member may be guided as shown by the arrow and by the dashed line portion of brace section 40 in FIG. 3. When the brace section 40 is caused to be moved to the position as shown by the dashed line portion of FIG. 3, the leg support member 2 will fold in the recessed region 10. Thus, all the components related to the leg support member will be within the recessed region 10 or, in other words, within the outer dimensional limits of the table platform. The table in this form can be stowed away and stacked adjacent other similar tables in a compact and stable manner.

As set forth hereinbefore, this table may be utilized in various types of base sections, as for example, in a slotway attached to a wall. Also, the brace member may be positioned in relation to the slotways and to the leg support member to establish other than the 90° angle of the present embodiment.

Figure 2:
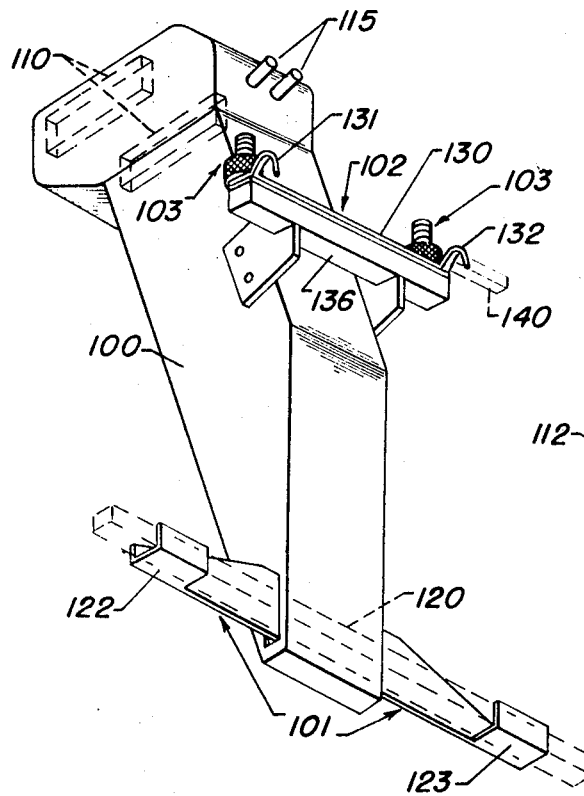
FIG. 2 is a schematical pictorial view of an embodiment of the pedestal base section.

Also considered as within the scope of this invention is a special pedestal base section for supporting the table section of FIG. 1. This base is adapted for mounting between a pair of seats and for connecting to the under framing of the seats. A pictorial illustration of this pedestal is schematically illustrated in FIG. 2. It is shown to comprise a support post 100, a lower projecting member 101, an upper projecting member 102, and a locking device 103. This particular configuration is especially adaptable for positioning between two airline seats.

The support post 100 has an upper end portion with slots 110 for insertion means or reception of an insertable table. Of course, the shape of these slots or insertion means must be such to receive a particular type of leg support. In this illustration, it is noted that slots 110 are adapted for receiving end 15 of the table section illustrated in FIG. 1.

Figure 4:
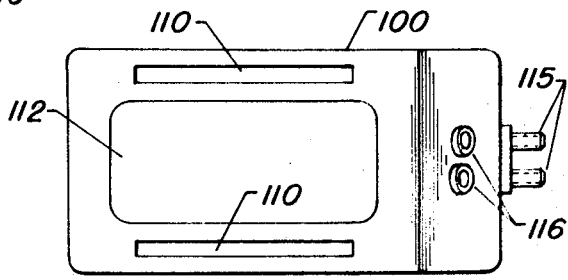
FIG. 4 is a partial top view of the pedestal base section showing an arrangement where the base not only serves as a support for a table but also serves as a convenience center for passengers.

FIG. 4 illustrates a top view of the upper end portion of support post 100. There it is shown how the support post can be adapted for serving as a convenience center for the passengers in the seats it is connected to. Illustrated are the two slots 110 for reception of two insertable tables, one for each adjacent seat. An opening or depression 112 is provided in the upper portion of support post 100 between the slots 110. This opening is sized for reception of an ash tray for the convenience of the passengers. In some instances, airlines provide an earphone system for utilization of the passengers in listening to stereophonic music, movies, television, etc. This particular support post has been adapted to contain a receptacle for such a system. Male plugs 115 are provided for plugging into the existing console between the seats, while female receptacles 116 are provided on the slanted surface of support post for passenger use.

Referring to the illustration of the support post, it is to be noted that the lower projecting member 101 includes, in this particular embodiment, two projections 122 and 123 on each side of the support post. Projections 122 and 123 are shaped to engage the lower portion of the under framing of the particular seat arrangement. By utilizing projections 122 and 123 on both sides of the support post, lateral stability is established. The dashed lines indicate a representative beam 120 which is part of the under framing of the adjacent seats. Of course, the arrangement of projections 122 and 123 should not be limited to the particular shape as illustrated in FIG. 2. In other words, if the under framing of two particular seats comprises a beam of a different size or shape than shown in FIG. 2, the projections 122 and 123 may have to be shaped differently to correspond with the shape of the beam.

The upper projecting member 102 comprises a plate 130 with hooked end portions 131 and 132. Plate 130 is sized to fit over a projecting block or shoulder 136 attached to the upper portion of the support post 100. The hooked portions 131 and 132 are provided to engage within holes or other openings which may be, in turn, provided in the upper portions of the seat framing as represented by a portion of a beam 140. Beam 140 may, for example, be provided with drilled holes for insertion of the hooked portions 131 and 132. Of course, other forms of under framing are contemplated, and therefore, the particular form of projecting member 102 should not be limiting upon this present improvement. Although the end portions 131 and 132 are readily adaptable to most types of under framing, all that is required to make the under framing compatible with the projecting member is to drill two matching holes in the under framing.

The locking means 103 in this particular instance comprise a pair of hand turned screw fasteners which lock plate 130 to block 136. The screw fasteners are so disposed that their upward and downward movement will provide a means for adjusting the distance between end sections 131 and 132 and projections 122 and 123 of lower projecting member 101. Other forms of locking means are contemplated to be within the scope of this improvement, as for example, the upper projecting member may be screwed directly into the under framing of the seats to be locked in place. Also, it is contemplated that only one screw fastener be utilized.

It may well be understood that various minor modifications in the design and/or location of the various portions of the pedestal base as well as of the table may be made without diverting from the scope of the present invention. For example, there may be a variation in the shape of the platform of the table, or in locating and designing the particular leg support member. The support post of the pedestal base may be shaped differently than shown in the schematical pictorial. For instance, it may be basically a round shape as opposed to the squared-corner shape of FIG. 2.

We claim as our invention:

1. In a seating arrangement including a removable stowable table with a pedestal base adapted for mounting between a pair of adjacent seats and for connecting to the under framing thereof, the combination comprising:
    (a) a support post having an upper end portion with slot means therein for reception of said insertable table;
    (b) a lower projecting member from said support post sized to engage a lower portion of seat under framing;
    (c) an upper projecting member from said support post, sized to engage an upper portion of seat under framing;
    (d) locking means associated with at least one of said projecting members for latching said projecting members in a fixed relationship with the under framing of said seats;
    (e) a table platform having a substantially flat top surface and a lower surface with a recessed region therein;
    (f) a leg support member having an end sized for inserting into said slot means, said end being elongated to substantially fill said slot and being provided with stop means to maintain said table a predetermined distance above said post and having an opposing end rotatably connected to said platform within said recessed region, and said leg support member sized and positioned to be capable of folding completely into said recessed region;
    (g) brace guide means connected to said platform within said recessed region, said brace guide means including an elongated slotway substantially parallel with the surface of said platform and perpendicular to the axis of rotation of said leg support member and a secondary slotway transversely communicating with said elongated slotway;
    (h) a brace member having a first end rotatably connected to said leg support member and having a second end slideably engaged and connected to said slotways;
    (i) spring means connected to said platform within said recessed region, said spring means positioned in proximity to said secondary slotway and biased to maintain the second end of said brace member in said secondary slotway when said second end is caused to be located therein to thereby maintain said leg support and brace members in a rigid relationship to said platform; and,
    (j) releasing means connected to said table within said recessed region for counteracting the bias of said spring means and for permitting movement of the second end of said brace member into said elongated slotway, whereby, when activated, said releasing means will move said brace member from the bias of said spring means into a slideable relationship with said elongated slotway to thereby permit said leg support member to be rotated completely into said recessed region.

2. The invention as defined in claim 1 wherein said lower projecting member includes two spaced apart projections, one located on each side of said support post, each being sized to engage the lower portion of the under framing of said seats, whereby lateral stability is established.

3. The invention as defined in claim 1 wherein said upper projecting member has two spaced apart end portions, one disposed on each side of said support post, and each sized to engage the upper portion of the under framing of said seats, whereby lateral stability is established.

4. The pedestal base of claim 1 further characterized in that said support post includes a projecting block for support of said upper projecting member, and in that said locking means comprises at least one screw fastener that provides an adjustment for the distance between said upper projecting member and said lower projecting member.

5. The invention as defined in claim 1 wherein said support post is provided with two slot means therein to receive the ends of two of said leg support members.

References Cited

UNITED STATES PATENTS

| | | | |
|---|---|---|---|
| 550,443 | 11/1895 | Deal | 297—170X |
| 811,480 | 1/1906 | Camfield | 297—170X |
| 912,936 | 2/1909 | Cowdrey | 108—152X |
| 1,267,046 | 5/1918 | Beaird | 108—135 |
| 1,778,124 | 10/1930 | Sauer | 108—132 |
| 1,984,602 | 12/1934 | Snyder | 108—134X |
| 2,077,855 | 4/1937 | Riess | 297—170 |
| 2,352,837 | 7/1944 | Hillenbrand | 108—134 |
| 2,474,450 | 6/1949 | Woodruff | 108—132 |
| 3,206,249 | 9/1965 | Gateley | 297—115X |

FRANCIS K. ZUGEL, Primary Examiner

U.S. Cl. X.R.

108—135, 152; 297—170